United States Patent

Kato et al.

Patent Number: 6,032,032
Date of Patent: Feb. 29, 2000

[54] MOBILE RADIO COMMUNICATION APPARATUS

[75] Inventors: Hidenobu Kato; Seiichi Yamaguchi; Fujio Sasaki, all of Yokohama; Hiroaki Kosugi, Osaka, all of Japan

[73] Assignee: Matsushita Electric Industrial Co., Ltd., Osaka, Japan

[21] Appl. No.: 08/787,311

[22] Filed: Jan. 24, 1997

[30] Foreign Application Priority Data

Mar. 25, 1996 [JP] Japan ................................. 8-068368

[51] Int. Cl.[7] ................................................ H04B 1/16
[52] U.S. Cl. .......................... 455/266; 455/306; 455/340; 455/552
[58] Field of Search .................................. 455/266, 339, 455/340, 303, 306, 224, 225, 168.1, 188.1, 188.2, 189.1, 190.1, 314, 207, 209, 552, 553; 348/725, 726

[56] References Cited

U.S. PATENT DOCUMENTS 5,008,895  4/1991  Pireh ........................................ 455/552
5,442,353  8/1995  Jackson .
5,548,831  8/1996  Bijker et al. ............................ 455/207

FOREIGN PATENT DOCUMENTS 57-84628    5/1982  Japan .
58-210727  12/1983  Japan .
7183806    7/1995  Japan .

*Primary Examiner*—Lee Nguyen
*Attorney, Agent, or Firm*—Pollock, Vande Sande & Amernick

[57] ABSTRACT

A radio communication apparatus is designed for at least first and second radio communication formats which prescribe first and second desired IF pass bandwidths respectively. The first desired IF pass bandwidth is greater than the second desired IF pass bandwidth. The radio communication apparatus includes an IF band-pass filter processing a first IF signal into a second IF signal and having a predetermined pass bandwidth corresponding to the first desired IF pass bandwidth. A demodulator recovers a first baseband signal from the second IF signal generated by the IF band-pass filter. A baseband filter processes the first baseband signal generated by the demodulator into a second baseband signal. The first baseband signal generated by the demodulator is selected as a final output signal when the first IF signal is of the first radio communication format. The second baseband signal generated by the baseband filter is selected as a final output signal when the first IF signal is of the second radio communication format.

4 Claims, 3 Drawing Sheets

MOBILE RADIO COMMUNICATION APPARATUS

BACKGROUND OF THE INVENTION

1. Field of the Invention

This invention relates to a mobile radio communication apparatus.

2. Description of the Prior Art

Most of receiving sections in mobile radio communication transceivers are of superheterodyne types. There are various mobile radio communication formats using different modulation/demodulation types, respectively. Accordingly, a desired IF (intermediate frequency) bandwidth varies from format to format. Generally, an IF circuit in a receiving section which has an IF bandwidth chosen in conformity with one format can not suitably handle a signal of another format.

SUMMARY OF THE INVENTION

It is an object of this invention to provide an improved mobile radio communication apparatus.

A first aspect of this invention provides a radio communication apparatus for at least first and second radio communication formats which prescribe first and second desired IF pass bandwidths respectively, the first desired IF pass bandwidth being greater than the second desired IF pass bandwidth, the apparatus comprising an IF band-pass filter processing a first IF signal into a second IF signal and having a predetermined pass bandwidth corresponding to the first desired IF pass bandwidth; a demodulator recovering a first baseband signal from the second IF signal generated by the IF band-pass filter; a baseband filter processing the first baseband signal generated by the demodulator into a second baseband signal; and means for selecting the first baseband signal generated by the demodulator as a final output signal when the first IF signal is of the first radio communication format, and for selecting the second baseband signal generated by the baseband filter as a final output signal when the first IF signal is of the second radio communication format.

A second aspect of this invention is based on the first aspect thereof, and provides a radio communication apparatus wherein the means comprises a switch for selectively bypassing the baseband filter.

A third aspect of this invention is based on the first aspect thereof, and provides a radio communication apparatus wherein the means comprises a switch for selecting one out of the first baseband signal generated by the demodulator and the second baseband signal generated by the baseband filter.

DESCRIPTION OF THE PREFERRED EMBODIMENTS

Figure 1:
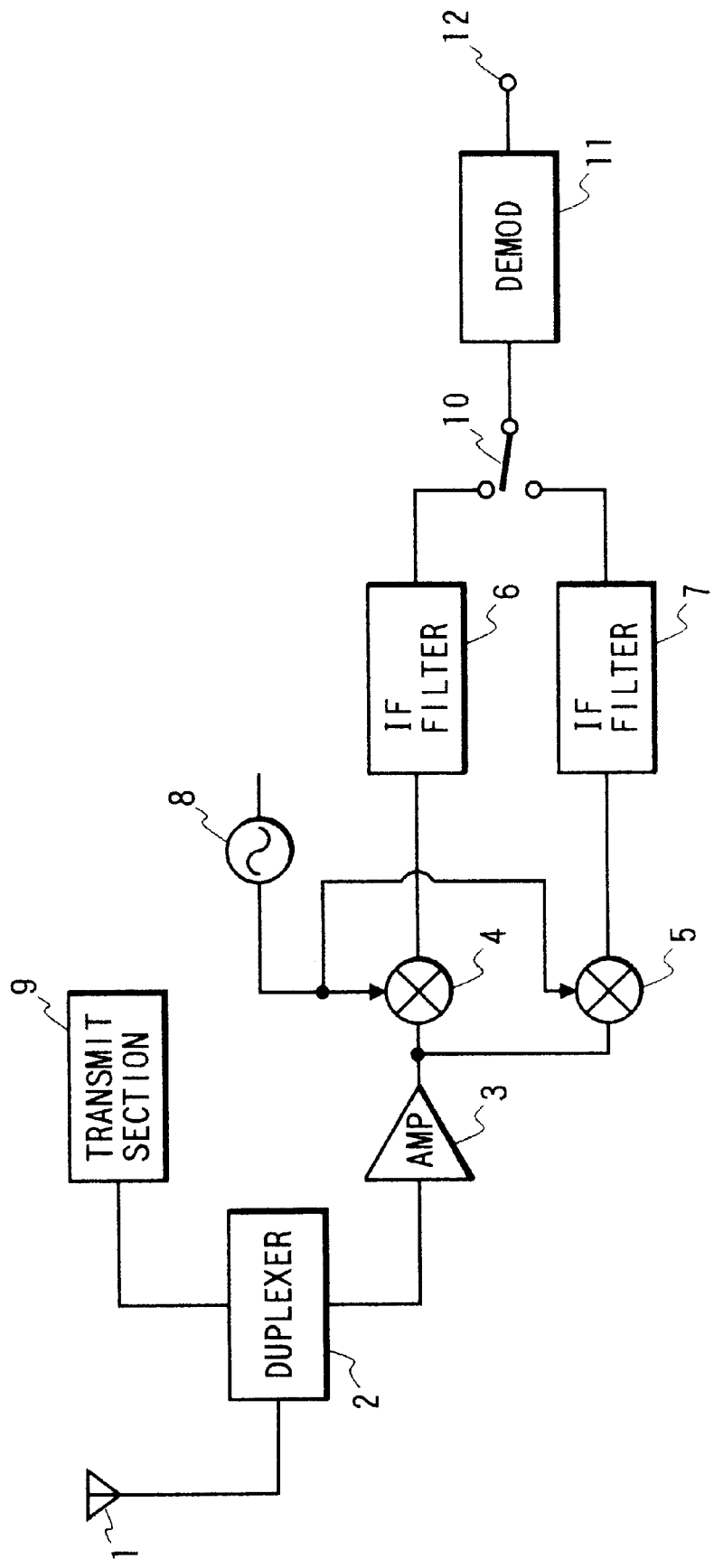
FIG. 1 is a block diagram of a mobile radio communication transceiver according to a first embodiment of this invention.

With reference to FIG. 1, a mobile radio communication transceiver is provided with an antenna 1 connected to a duplexer 2. The duplexer 2 is connected to a receiving section and a transmitting section 9.

The receiving section includes an RF (radio frequency) preamplifier 3, mixers 4 and 5, IF (intermediate frequency) band-pass filters 6 and 7, a local oscillator 8, a switch 10, a demodulator 11, and an output terminal 12.

The input terminal of the RF preamplifier 3 is connected to the duplexer 2. The output terminal of the RF preamplifier 3 is connected to first input terminals of the mixers 4 and 5. The output terminal of the local oscillator 8 is connected to second input terminals of the mixers 4 and 5. The output terminal of the mixer 4 is connected to the input terminal of the IF band-pass filter 6. The output terminal of the IF band-pass filter 6 is connected to a first input side of the switch 10. The output terminal of the mixer 5 is connected to the input terminal of the IF band-pass filter 7. The output terminal of the IF band-pass filter 7 is connected to a second input side of the switch 10. An output side of the switch 10 is connected to the input terminal of the demodulator 11. The demodulator 11 is followed by the output terminal 12 of the receiving section.

The IF band-pass filter 6 has a pass bandwidth predetermined in conformity with a mobile radio communication format "A". The IF band-pass filter 7 has a pass bandwidth predetermined in conformity with a mobile radio communication format "B" which differs from the mobile radio communication format "A". The pass bandwidth of the IF band-pass filter 6 is wider than the pass bandwidth of the IF band-pass filter 7. The pass bandwidth of the IF band-pass filter 6 is equal to, for example, 1.23 MHz. The pass bandwidth of the IF band-pass filter 7 is equal to, for example, 30 kHz.

The switch 10 can be changed between first and second positions. When the switch 10 assumes the first position, the switch 10 connects the IF band-pass filter 6 to the demodulator 11 and disconnects the IF band-pass filter 7 from the demodulator 11. When the switch 10 assumes the second position, the switch 10 connects the IF band-pass filter 7 to the demodulator 11 and disconnects the IF band-pass filter 6 from the demodulator 11.

The demodulator 11 has first and second sections connected in parallel. The first section of the demodulator 11 serves to demodulate an IF signal of the mobile radio communication format "A" into a baseband signal. The second section of the demodulator 11 serves to demodulate an IF signal of the mobile radio communication format "B" into a baseband signal.

Operation of the receiving section of the mobile radio communication transceiver in FIG. 1 can be changed between first and second modes by the switch 10. The first and second modes of operation correspond to the mobile radio communication formats "A" and "B" respectively. During the first mode of operation of the receiving section, the switch 10 is in its first position at which the demodulator 11 is connected to the IF band-pass filter 6 and is disconnected from the IF band-pass filter 7. During the second mode of operation of the receiving section, the switch 10 is in its second position at which the demodulator 11 is connected to the IF band-pass filter 7 and is disconnected from the IF band-pass filter 6.

The first mode of operation of the receiving section of the mobile radio communication transceiver in FIG. 1 will now be explained in more detail. A signal of the mobile radio communication format "A" which is received by the antenna 1 travels to the mixer 4 via the duplexer 2 and the RF preamplifier 3. The mixer 4 receives an output signal of the local oscillator 8. The mixer 4 frequency-converts the received signal of the mobile radio communication format "A" into an IF signal in response to the output signal of the local oscillator 8. The IF signal of the mobile radio communication format "A" travels from the mixer 4 to the demodulator 11 through the IF band-pass filter 6 and the switch 10. The IF signal of the mobile radio communication format "A" is subjected by the IF band-pass filter 6 to a filtering process suited to the mobile radio communication format "A". The demodulator 11 recovers a baseband signal from the IF signal of the mobile radio communication format "A". The demodulator 11 feeds the recovered baseband signal to the output terminal 12.

The second mode of operation of the receiving section of the mobile radio communication transceiver in FIG. 1 will now be explained in more detail. A signal of the mobile radio communication format "B" which is received by the antenna 1 travels to the mixer 5 via the duplexer 2 and the RF preamplifier 3. The mixer 5 receives the output signal of the local oscillator 8. The mixer 5 frequency-converts the received signal of the mobile radio communication format "B" into an IF signal in response to the output signal of the local oscillator 8. The IF signal of the mobile radio communication format "B" travels from the mixer 5 to the demodulator 11 through the IF band-pass filter 7 and the switch 10. The IF signal of the mobile radio communication format "B" is subjected by the IF band-pass filter 7 to a filtering process suited to the mobile radio communication format "B". The demodulator 11 recovers a baseband signal from the IF signal of the mobile radio communication format "B". The demodulator 11 feeds the recovered baseband signal to the output terminal 12.

The transmitting section 9 generates a signal to be transmitted. The transmitted signal is fed from the transmitting section 9 to the antenna 1 via the duplexer 2. The transmitted signal is radiated by the antenna 1.

As understood from the previous explanation, the receiving section of the mobile radio communication transceiver in FIG. 1 can handle both a received signal of the mobile radio communication format "A" and a received signal of the mobile radio communication format "B".

Figure 2:
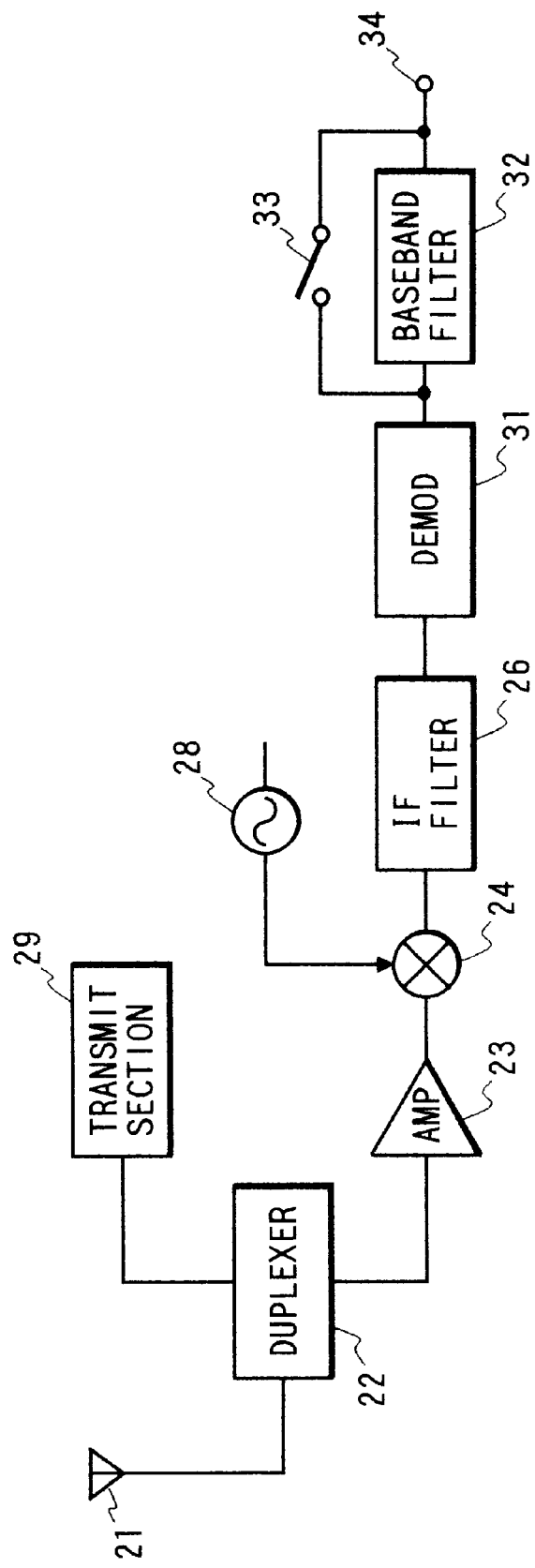
FIG. 2 is a block diagram of a mobile radio communication transceiver according to a second embodiment of this invention.

With reference to FIG. 2, a mobile radio communication transceiver is provided with an antenna 21 connected to a duplexer 22. The duplexer 22 is connected to a receiving section and a transmitting section 29.

The receiving section includes an RF (radio frequency) preamplifier 23, a mixer 24, an IF (intermediate frequency) band-pass filter 26, a local oscillator 28, a demodulator 31, a baseband filter 32, a switch 33, and an output terminal 34.

The input terminal of the RF preamplifier 23 is connected to the duplexer 22. The output terminal of the RF preamplifier 23 is connected to a first input terminal of the mixer 24. The output terminal of the local oscillator 28 is connected to a second input terminal of the mixer 24. The output terminal of the mixer 24 is connected to the input terminal of the IF band-pass filter 26. The output terminal of the IF band-pass filter 26 is connected to the input terminal of the demodulator 31. The output terminal of the demodulator 31 is connected to the input terminal of the baseband filter 32. Also, the output terminal of the demodulator 31 is connected to the switch 33. The output terminal of the baseband filter 32 is connected to the output terminal 34 of the receiving section. In addition, the switch 33 is connected to the output terminal 34 of the receiving section. Thus, the switch 33 is connected between the input terminal and the output terminal of the baseband filter 32.

The IF band-pass filter 26 has a pass bandwidth predetermined in conformity with the mobile radio communication format "A". The pass bandwidth of the IF band-pass filter 26 is wider than a pass bandwidth desired for the mobile radio communication format "B". The pass bandwidth of the IF band-pass filter 26 is equal to, for example, 1.23 MHz.

The switch 33 can be changed between a closed position and an open position. When the switch 33 assumes the closed position, the switch 33 short-circuits the baseband filter 32. Thus, in this case, the baseband filter 32 is bypassed, and the demodulator 31 is directly connected to the output terminal 34 of the receiving section. When the switch 33 assumes the open position, the switch 33 inhibits the direct connection between the demodulator 31 and the output terminal 34 of the receiving section. Thus, in this case, the baseband filer 32 is operably placed between the demodulator 31 and the output terminal 34 of the receiving section. The baseband filter 32 is of, for example, a low pass type or a band-pass type.

The demodulator 31 has first and second sections connected in parallel. The first section of the demodulator 31 serves to demodulate an IF signal of the mobile radio communication format "A" into a baseband signal. The second section of the demodulator 31 serves to demodulate an IF signal of the mobile radio communication format "B" into a baseband signal.

Operation of the receiving section of the mobile radio communication transceiver in FIG. 2 can be changed between first and second modes by the switch 33. The first and second modes of operation correspond to the mobile radio communication formats "A" and "B" respectively. During the first mode of operation of the receiving section, the switch 33 is in its closed position at which the baseband filter 32 is bypassed. During the second mode of operation of the receiving section, the switch 33 is in its open position at which the baseband filter 32 is operably placed between the demodulator 31 and the output terminal 34 of the receiving section.

The first mode of operation of the receiving section of the mobile radio communication transceiver in FIG. 2 will now be explained in more detail. A signal of the mobile radio communication format "A" which is received by the antenna 21 travels to the mixer 24 via the duplexer 22 and the RF preamplifier 23. The mixer 24 receives an output signal of the local oscillator 28. The mixer 24 frequency-converts the received signal of the mobile radio communication format "A" into an IF signal in response to the output signal of the local oscillator 28. The IF signal of the mobile radio communication format "A" travels from the mixer 24 to the demodulator 31 through the IF band-pass filter 26. The IF signal of the mobile radio communication format "A" is subjected by the IF band-pass filter 26 to a filtering process suited to the mobile radio communication format "A". The demodulator 31 recovers a baseband signal from the IF signal of the mobile radio communication format "A". The recovered baseband signal is transmitted from the demodulator 31 to the output terminal 34 via the switch 33 without passing through the baseband filter 32. Accordingly, in this case, the baseband signal recovered by the demodulator 31 is used or selected as an output signal of the receiving section.

The second mode of operation of the receiving section of the mobile radio communication transceiver in FIG. 2 will now be explained in more detail. A signal of the mobile radio communication format "B" which is received by the antenna 21 travels to the mixer 24 via the duplexer 22 and the RF preamplifier 23. The mixer 24 receives the output signal of the local oscillator 28. The mixer 24 frequency-converts the received signal of the mobile radio communication format "B" into an IF signal in response to the output signal of the local oscillator 28. The IF signal of the mobile radio communication format "B" travels from the mixer 24 to the demodulator 31 through the IF band-pass filter 26. The IF signal of the mobile radio communication format "B" is subjected by the IF band-pass filter 26 to an inadequate filtering process rather than a filtering process suited to the mobile radio communication format "B". The demodulator 31 recovers a first baseband signal from the IF signal of the mobile radio communication format "B". The demodulator 31 outputs the first baseband signal to the baseband filter 32. The baseband filter 32 subjects the first baseband signal to a filtering process, and thereby processes the first baseband signal into a second baseband signal. Specifically, the baseband filter 32 removes unwanted frequency components from the first baseband signal. The filtering process provided by the baseband filter 32 is designed to compensate for the inadequate filtering process provided by the IF band-pass filter 26 in connection with the mobile radio communication format "B". The baseband filter 32 feeds the second baseband signal to the output terminal 34. Accordingly, in this case, the second baseband signal recovered by the baseband filter 32 is used or selected as an output signal of the receiving section.

The transmitting section 29 generates a signal to be transmitted. The transmitted signal is fed from the transmitting section 29 to the antenna 21 via the duplexer 22. The transmitted signal is radiated by the antenna 21.

As understood from the previous explanation, the receiving section of the mobile radio communication transceiver in FIG. 2 can handle both a received signal of the mobile radio communication format "A" and a received signal of the mobile radio communication format "B". In the mobile radio communication transceiver in FIG. 2, an IF circuit including the mixer 24 and the IF band-pass filter 26 can be used in common for both the mobile radio communication formats "A" and "B". Thus, there is an advantage in cost.

Figure 3:
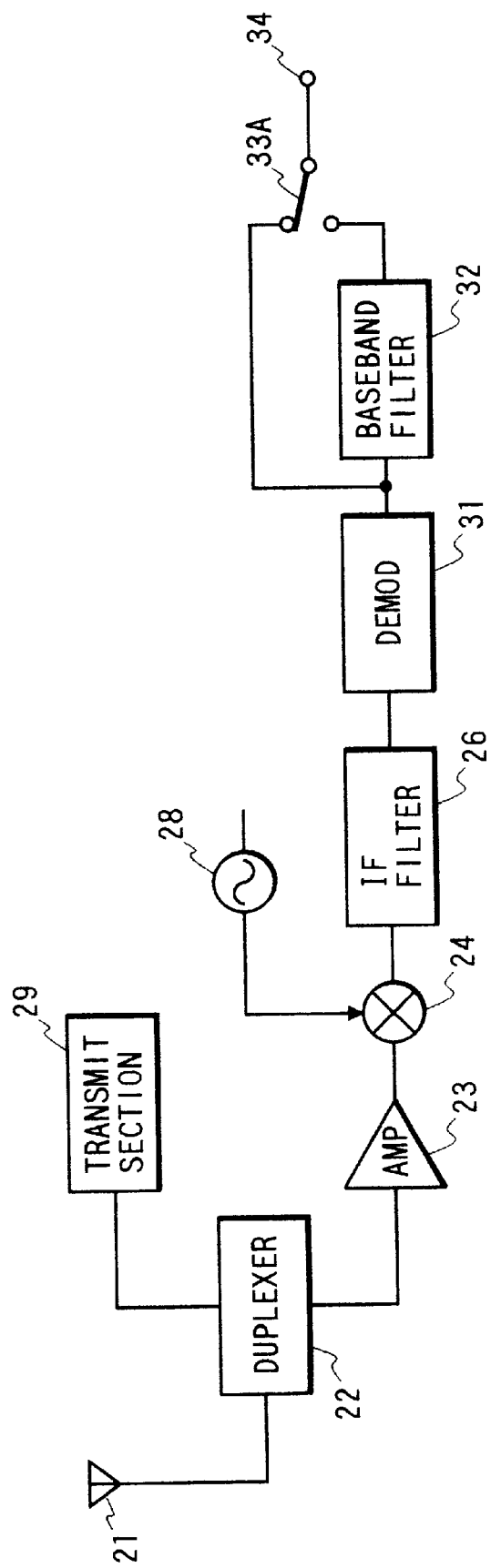
FIG. 3 is a block diagram of a mobile radio communication transceiver according to a third embodiment of this invention.

FIG. 3 shows a mobile radio communication transceiver which is similar to the mobile radio communication transceiver in FIG. 2 except for a design change indicated hereinafter.

The mobile radio communication transceiver in FIG. 3 includes a switch 33A instead of the switch 33 in FIG. 2. In the mobile radio communication transceiver of FIG. 3, the output terminal of the demodulator 31 is connected to the input terminal of the baseband filter 32 and also a first input side of the switch 33A. The output terminal of the baseband filter 32 is connected to a second input side of the switch 33A. An output side of the switch 33A is followed by the output terminal 34 of the receiving section.

The switch 33A can be changed between first and second positions. When the switch 33A assumes the first position, the switch 33A connects the demodulator 31 to the output terminal 34 and disconnects the baseband filter 32 from the output terminal 34. When the switch 33A assumes the second position, the switch 33A connects the baseband filter 32 to the output terminal 34 and disconnects the demodulator 31 from the output terminal 34.

Operation of the receiving section of the mobile radio communication transceiver in FIG. 3 can be changed between first and second modes by the switch 33A. The first and second modes of operation correspond to the mobile radio communication formats "A" and "B" respectively. During the first mode of operation of the receiving section, the switch 33A is in its first position at which the output terminal 34 is connected to the modulator 31 and is disconnected from the baseband filter 32. During the second mode of operation of the receiving section, the switch 33A is in its second position at which the output terminal 34 is connected to the baseband filter 32 and is disconnected from the demodulator 31.

The first mode of operation of the receiving section of the mobile radio communication transceiver in FIG. 3 will now be explained in more detail. A signal of the mobile radio communication format "A" which is received by the antenna 21 travels to the mixer 24 via the duplexer 22 and the RF preamplifier 23. The mixer 24 receives an output signal of the local oscillator 28. The mixer 24 frequency-converts the received signal of the mobile radio communication format "A" into an IF signal in response to the output signal of the local oscillator 28. The IF signal of the mobile radio communication format "A" travels from the mixer 24 to the demodulator 31 through the IF band-pass filter 26. The IF signal of the mobile radio communication format "A" is subjected by the IF band-pass filter 26 to a filtering process suited to the mobile radio communication format "A". The demodulator 31 recovers a baseband signal from the IF signal of the mobile radio communication format "A". The recovered baseband signal is transmitted from the demodulator 31 to the output terminal 34 via the switch 33A. Accordingly, in this case, the baseband signal recovered by the demodulator 31 is selected as an output signal of the receiving section.

The second mode of operation of the receiving section of the mobile radio communication transceiver in FIG. 3 will now be explained in more detail. A signal of the mobile radio communication format "B" which is received by the antenna 21 travels to the mixer 24 via the duplexer 22 and the RF preamplifier 23. The mixer 24 receives the output signal of the local oscillator 28. The mixer 24 frequency-converts the received signal of the mobile radio communication format "B" into an IF signal in response to the output signal of the local oscillator 28. The IF signal of the mobile radio communication format "B" travels from the mixer 24 to the demodulator 31 through the IF band-pass filter 26. The IF signal of the mobile radio communication format "B" is subjected by the IF band-pass filter 26 to an inadequate filtering process rather than a filtering process suited to the mobile radio communication format "B". The demodulator 31 recovers a first baseband signal from the IF signal of the mobile radio communication format "B". The demodulator 31 outputs the first baseband signal to the baseband filter 32. The baseband filter 32 subjects the first baseband signal to a filtering process, and thereby processes the first baseband signal into a second baseband signal. Specifically, the baseband filter 32 removes unwanted frequency components from the first baseband signal. The filtering process provided by the baseband filter 32 is designed to compensate for the inadequate filtering process provided by the IF band-pass filter 26 in connection with the mobile radio communication format "B". The baseband filter 32 feeds the second baseband signal to the output terminal 34 via the switch 33A. Accordingly, in this case, the second baseband signal generated by the baseband filter 32 is selected as an output signal of the receiving section.

As understood from the previous explanation, the receiving section of the mobile radio communication transceiver in FIG. 3 can handle both a received signal of the mobile radio communication format "A" and a received signal of the mobile radio communication format "B". In the mobile radio communication transceiver in FIG. 3, an IF circuit including the mixer 24 and the IF band-pass filter 26 can be used in common for both the mobile radio communication formats "A" and "B". Thus, there is an advantage in cost.

What is claimed is:

1. A radio communication apparatus for at least first and second radio communication formats which prescribe first and second desired IF pass bandwidths respectively, the first desired IF pass bandwidth being greater than the second desired IF pass bandwidth, the apparatus comprising:

an IF band-pass filter processing a first IF signal into a second IF signal and having a predetermined pass bandwidth corresponding to the first desired IF pass bandwidth, the IF bandpass filter performing an inadequate filtering process if the first IF signal is of the second radio communication format;

a demodulator recovering a first baseband signal from the second IF signal generated by the IF band-pass filter;

a baseband filter processing the first baseband signal generated by the demodulator into a second baseband signal if the first IF signal is of the second radio communication format, the baseband filter being capable of compensating for the inadequate filtering process performed by the IF bandpass filter; and means for selecting the first baseband signal generated by the demodulator as a final output signal when the first IF signal is of the first radio communication format, and for selecting the second baseband signal generated by the baseband filter as a final output signal when the first IF signal is of the second radio communication format.

2. A radio communication apparatus according to claim 1, wherein the means comprises a switch for selectively bypassing the baseband filter.

3. A radio communication apparatus according to claim 1, wherein the means comprises a switch for selecting one out of the first baseband signal generated by the demodulator and the second baseband signal generated by the baseband filter.

4. A radio communication apparatus for at least first and second radio communication formats which prescribe first and second desired IF pass bandwidths respectively, the first desired IF pass bandwidth being greater than the second desired IF pass bandwidth, the apparatus comprising:

an IF band-pass filter processing a first IF signal into a second IF signal and having a predetermined pass bandwidth corresponding to the first desired IF pass bandwidth;

a demodulator recovering a first baseband signal from the second IF signal generated by the IF band-pass filter;

a baseband filter processing the first baseband signal generated by the demodulator into a second baseband signal, the baseband filter including one of a low pass filter and a band-pass filter and differing from a beat cancel filter; and means for selecting the first baseband signal generated by the demodulator as a final output signal when the first IF signal is of the first radio communication format, and for selecting the second baseband signal generated by the baseband filter as a final output signal when the first IF signal is of the second radio communication format.

* * * * *